United States Patent Office 3,138,187
Patented June 23, 1964

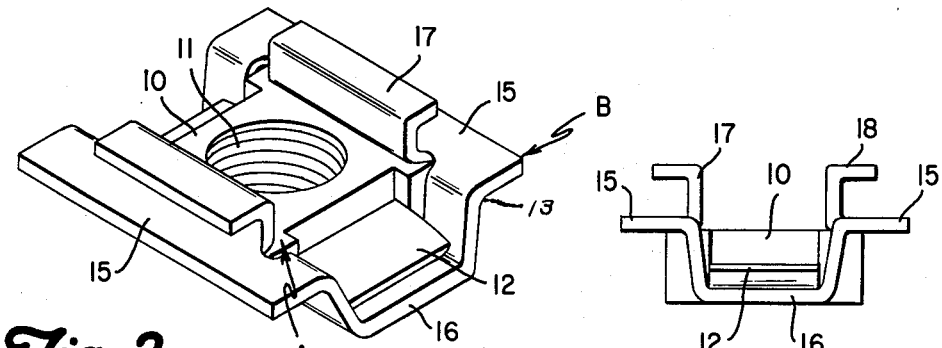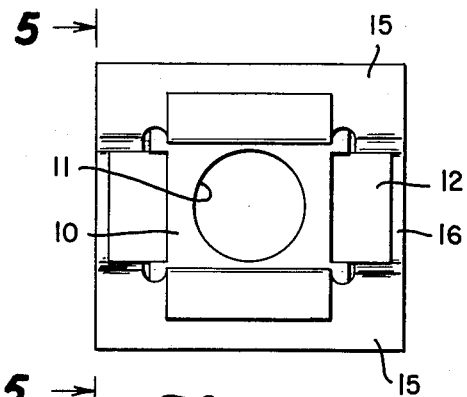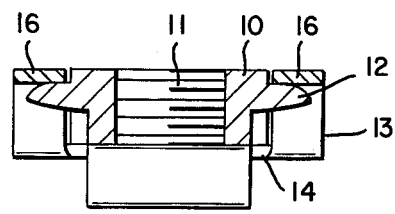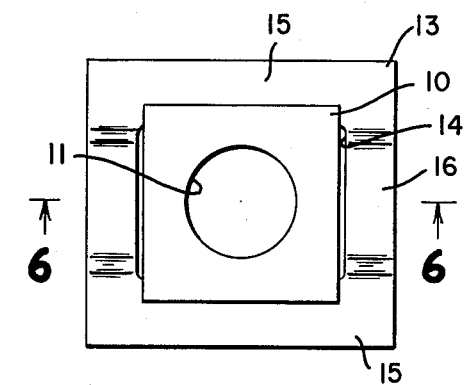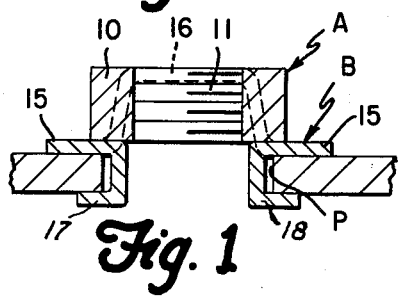

3,138,187
CAGE NUT
Leonard S. Jaworski, Toledo, Ohio, assignor to The Bishop and Babcock Corporation, Cleveland, Ohio, a corporation of Ohio
Filed Jan. 26, 1961, Ser. No. 85,046
1 Claim. (Cl. 151—41.75)

This invention relates to screw-receiving fastener devices but more particularly to so-called cage nuts which involve a nut element and a cage for receiving same which is adapted to be mounted in a panel aperture.

An object is to produce a cage nut assembly which is simple and inexpensive to manufacture on a quantity basis, is so designed that the parts can be assembled easily, has spring features which enable convenient mounting in a panel aperture, and requires a minimum amount of material for the cage or holder part.

Other objects and advantages of the invention will hereinafter appear and for purposes of illustration but not of limitation, an embodiment of the invention is shown on the accompanying drawings in which:

FIGURE 1 is a sectional view showing the cage nut mounted in a supporting panel;

FIGURE 2 is an enlarged bottom perspective view of the cage nut;

FIGURE 3 is an enlarged bottom plan view of the cage nut;

FIGURE 4 is an enlarged top plan view of the cage nut;

FIGURE 5 is an end elevation on the line 5—5 of FIGURE 3; and

FIGURE 6 is a sectional view on the line 6—6 of FIGURE 4.

The illustrated embodiment of the invention comprises a cage nut assembly which embodies a nut element A and a sheet metal cage or holder part B. These two parts are connected so as to provide a unit with the nut contained within the cage for receiving a screw-threaded bolt or the like, and in such manner that the nut has limited floating movements within the cage.

The nut element comprises a square metal nut body 10 having a centrally disposed screw-threaded hole 11. Two of the sides in opposed relation are plain but the opposite two sides have staked flanges 12 which are disposed centrally thereof and project at right angles thereto in opposite directions a substantial distance from the nut body and are disposed slightly below the upper face thereof.

The cage B is formed of relatively thin spring metal and consists of a body portion 13 which is generally square and is of greater lateral dimensions than that of the nut body. The cage body 13 is provided with a central hole formed by stamping portions therefrom, as will hereinafter appear, and substantially covering the hole 14 is the nut body 10, the under face of the plain sides of the nut overlapping a portion of the cage body. As shown, a pair of flat oppositely disposed side panels 15 are overlapped by the nut body.

The other two sides of the cage body 13 are pressed outwardly to provide arched inverted U-shaped spring portions 16 and it will be observed that the arched portions are disposed between the flat side panels 15. Extending into each of the arched portions is a staked flange 12 of the nut so that the staked flanges 12 prevent the nut from moving substantially in directions transverse of the cage. Sufficient space is provided between the nut and the arched portions of the cage to enable the nut to float to a limited extent relative to the cage in transverse directions at right angles to each other, thereby to facilitate the application of a bolt or the like thereto.

As above mentioned, portions of the metal of the cage are struck therefrom to provide the central hole 14. One portion of the metal is bent to provide a relatively rigid hook 17 which depends from the lower portion of the cage with the hook facing in an outward direction. On the opposite side is a hook 18 which faces in the opposite direction and also depends from the underside of the body of the cage. The arched portions 16 provide spring reservoirs which enable the hooks resiliently to flex to a limited extent so that one hook for example may be engaged in a panel aperture P and then the cage is flexed sufficiently to enable entrance of the other hook, thereby to firmly engage the fastener in the panel opening. The hooks 17 and 18 are spread apart sufficiently to enable a bolt to be readily introduced for screw-threaded engagement with the threaded hole 11 of the nut body 10.

Numerous changes in details of construction, arrangement and choice of materials may be effected without departing from the spirit of the invention, especially as defined in the appended claim.

What I claim is:

A cage nut comprising in combination a spring metal cage member and a nut member carried by said cage member; said cage member having a body including a pair of flat laterally spaced narrow panel-engaging strips, a pair of upwardly arched parallelly extending spaced spring members integrally connecting the inner edges of said strips respectively and providing the sole connecting means between said strips, said arched spring members being of substantial width and having parallel inner and outer edges and being spaced apart an amount sufficient to receive said nut member therebetween; hook elements integral respectively with the inner edges of said strips disposed beneath said strips and having free end portions parallel to said strips, said hook elements extending in opposite directions for engagement with the edges of a supporting panel aperture; and said nut member comprising a substantially flat body portion of generally rectangular formation, said flat body portion being arranged between and having opposite sides parallel to and slightly spaced from the inner edges of said arched members and having the marginal edges of the other two opposed sides resting upon the upper face of said strips respectively, said opposite side portions of said body portion having integral oppositely extending staked portions which are staked upwardly from said opposite side portions of the nut body lying between said strips, said staked portions projecting into the respective openings provided by said arched members to capture said nut member to said cage member, whereby lateral shifting movement of said nut member is limited by the relative spacing between the opposed sides of said nut and the inner edges of the respective arched spring members, and relative rotational movement of said nut member and said cage member is limited by the spacing of said staked portions and the respective openings provided by said arched spring members.

References Cited in the file of this patent
UNITED STATES PATENTS

| | | |
|---|---|---|
| 1,014,684 | Weygand | Jan. 16, 1912 |
| 2,244,823 | Burke | June 10, 1941 |
| 2,273,648 | Kost | Feb. 17, 1942 |
| 2,495,037 | Tinnerman | Jan. 17, 1950 |
| 2,585,728 | Bedford | Feb. 12, 1952 |
| 2,815,789 | Hutson et al. | Dec. 10, 1957 |
| 2,875,804 | Flora | Mar. 3, 1959 |
| 2,937,681 | Patten | May 24, 1960 |